(12) United States Patent
Bedell et al.

(10) Patent No.: US 7,569,198 B2
(45) Date of Patent: Aug. 4, 2009

(54) WET GAS SCRUBBING PROCESS

(75) Inventors: Michael W. Bedell, Bethlehem, PA (US); Patrick J. Maher, Kingwood, TX (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 138 days.

(21) Appl. No.: 11/880,664

(22) Filed: Jul. 24, 2007

(65) Prior Publication Data

US 2008/0050299 A1    Feb. 28, 2008

Related U.S. Application Data

(60) Provisional application No. 60/840,310, filed on Aug. 25, 2006.

(51) Int. Cl.
*B01D 47/00* (2006.01)
*B01D 53/50* (2006.01)

(52) U.S. Cl. .............. 423/215.5; 423/243.01; 423/243.06; 423/243.08

(58) Field of Classification Search .............. 423/215.5, 423/243.01, 243.06, 243.08
See application file for complete search history.

(56) References Cited

U.S. PATENT DOCUMENTS

| | | | | |
|---|---|---|---|---|
| 3,995,006 | A * | 11/1976 | Downs et al. | 423/243.08 |
| 4,325,713 | A * | 4/1982 | Rosenberg et al. | 423/243.06 |
| 4,600,567 | A | 7/1986 | Reeder | |
| 4,614,645 | A * | 9/1986 | Yoneda et al. | 423/240 R |
| 5,403,568 | A * | 4/1995 | Stowe, Jr. | 423/243.08 |
| 5,405,590 | A * | 4/1995 | Macedo et al. | 423/210 |
| 6,001,321 | A * | 12/1999 | Okazoe et al. | 423/243.01 |

* cited by examiner

*Primary Examiner*—Timothy C Vanoy
(74) *Attorney, Agent, or Firm*—Bruce M. Bordelon; Glenn T. Barrett

(57) ABSTRACT

The removal of particulates and acidic gases from the effluent from a fluid catalytic cracking process regenerator. The effluent is treated in two contacting stages with an effective amount of both a caustic solution as well as ammonia and the composition of the contacting solutions in the two stages is independently controlled.

21 Claims, 1 Drawing Sheet

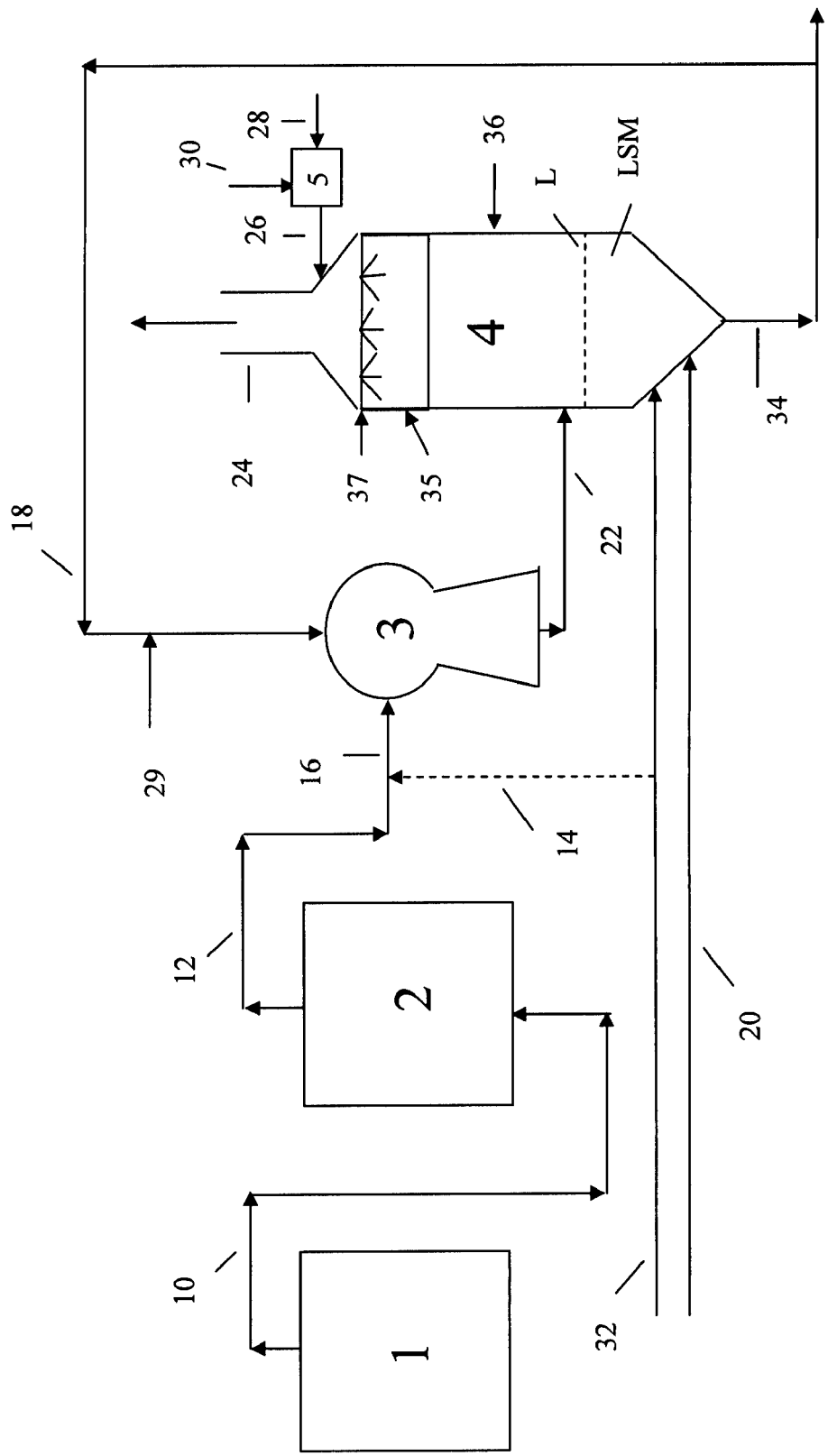
FIGURE

WET GAS SCRUBBING PROCESS

This application claims the benefit of U.S. Provisional Application No. 60/840,310 filed Aug. 25, 2006.

FIELD OF THE INVENTION

The present invention relates to the removal of particulates and acidic gases from the effluent from a fluid catalytic cracking process regenerator. The effluent is treated with an effective amount of both a caustic solution as well as ammonia.

BACKGROUND OF THE INVENTION

The gaseous mixture produced in the regenerator of fluid catalytic cracking (FCC) process systems contains solid particulates, including catalyst fines, and acidic gases, such as sulfur oxides. It is desirable to lower the level of both solid particulates and acidic gases from such a gaseous mixture before it is introduced into the atmosphere in order to minimize the release of pollutants to the atmosphere. Government regulations require that the concentration of sulfur dioxide from a FCC process unit be 25 ppmv (dry basis at 0% $O_2$) or less in order for the FCC process unit to qualify for clean unit status.

It is known that solid particulates can be removed from gases by wet gas scrubbing methods including scrubbing gases in venturi scrubbers in which the scrubbing liquid, and particulate-containing gases are mixed under pressure. The gases or vapors are passed with the scrubbing liquid through a constricted passage of the scrubber wherein intimate mixing of scrubbing liquid and gas occurs. Generally, the effluent of the scrubber (which may be one or more venturi structures in series or in parallel) is passed to a separator in which the contaminated liquid is separated from the cleaned gas. It is also known that acidic or basic materials may be added to the scrubbing liquid to neutralize or absorb basic or acidic contaminants that may be present in the gas that is subjected to the wet scrubbing treatment.

In order to remove an acidic gas, such as $SO_2$, from a gaseous effluent stream wet gas scrubbing will typically use a basic material, preferably a caustic. The caustic reacts with the $SO_2$ and removes it from the effluent stream. A significant amount of work has been done over the years to improve wet gas scrubbing technology. For example, U.S. Pat. Nos. 3,970,740 and 4,600,567 teach a wet gas scrubbing process for the removal of catalyst fines and acidic gases from the FCC regenerator gaseous effluent by scrubbing with an aqueous basic solution. The basic solution is maintained within a critical pH range of about 6 to 7 in a jet ejector venturi scrubbing system. The basic material is selected from alkali hydroxide, ammonia or ammonium hydroxide.

U.S. Pat. No. 6,139,807 teaches an apparatus for removing $SO_2$ from flue gas streams wherein the flue gas stream is contacted in a scrubbing zone with an aqueous ammonium or ammonium hydroxide solution. It is also mentioned that a caustic, such as sodium or potassium hydroxide, can also be used. This '807 patent also requires an additional step which is the oxidation of the absorption liquid to produce ammonium sulfate that can be used in the production of fertilizer.

While various wet gas scrubbing processes have met with various degrees of technical and commercial success, there still remains a need in the art for improved wet gas scrubbing processes capable of economically achieving lower levels of acidic gases.

SUMMARY OF THE INVENTION

In an embodiment, there is provided a process for removing sulfur dioxide and solid particulates from a gaseous effluent containing same, which process comprises:

a) contacting the gaseous effluent with an aqueous scrubbing solution comprised of an effective amount of a caustic, an effective amount of liquid ammonia, or both, said scrubbing solution being at a pH of about 6 to about 8 which contacting is performed in a scrubbing zone under high velocity mixing conditions thereby resulting in an admixture of a liquid phase containing solids and dissolved sulfur dioxide, and gaseous effluent;

b) passing the resulting admixture to a separation zone wherein the liquid phase containing the solids is separated from the gaseous effluent which is substantially solids free and having a substantially reduced level of sulfur dioxide;

c) mixing an effective amount of vapor phase ammonia with said substantially solids free gaseous effluent containing substantially reduced levels of sulfur dioxide;

d) passing said mixture of step c) above upward and countercurrent to downflowing water thereby removing substantially all of any remaining sulfur dioxide of said gaseous effluent; and e) emitting said resulting gaseous effluent into the atmosphere, which resulting gaseous effluent is substantially free of both particulates and sulfur dioxide.

In a preferred embodiment the scrubbing zone is a venturi wherein the particulate laden gaseous effluent and a high velocity stream of the scrubbing mixture is passed through a constricted passage of said venturi.

In another preferred embodiment vaporized ammonia is added to the gaseous effluent passing from first stage contacting to the second stage contacting and flows upward through downflowing water in said second contacting stage.

In still another preferred embodiment the resulting treated gaseous effluent is reheated above its dew point prior to discharging it to the atmosphere from said second contacting stage.

BRIEF DESCRIPTION OF THE FIGURE

The sole FIGURE hereof is a diagrammatic flow plan of a preferred embodiment of the present invention.

DETAILED DESCRIPTION OF THE INVENTION

The process of the present invention is suitable for removing solid particulates and acidic gases, particularly $SO_2$, from gaseous effluent streams from refinery process units, especially relatively low pressure gaseous effluent streams. The process of the invention is particularly suitable for removing solid particulates and acidic gases from a gaseous effluent stream produced in the regenerator of a catalytic cracking process unit. Fluid catalytic cracking processes are well known (see, for example, Hydrocarbon Processing, September 1972, pp. 131-138). During the cracking reaction, carbonaceous material deposits on the catalyst particles and thereby lowers their catalytic activity. The catalyst is typically regenerated by circulating a stream of the partially deactivated catalyst particles from the catalytic reaction zone to a regeneration zone where the carbonaceous deposit is burned from the catalytic particles by combustion in the presence of an oxygen-containing gas, such as air. The regeneration may be conducted in full burn mode, where substantially all of the CO is converted to $CO_2$, or in partial burn mode where a significant amount of CO remains in the effluent stream. For partial burn operation it is desired to lower the CO content. It is the conventional practice to pass the CO-containing effluent stream to a combustion zone, such as a CO boiler, or furnace, and thereby convert at least a portion of the CO to $CO_2$. In many known processes, the catalytic regeneration is conducted at relatively low pressures, for example, below about 30 pounds per square inch gauge (psig). The outlet pressure of the gaseous effluent of such a low pressure regenerator will therefore also be low. Furthermore, when a regenerator off-gas is burned in a combustion vessel, such as a CO boiler or furnace, the gases exiting from the combustion vessel will also be at a low pressure, typically, in the range of about −0.1 to 1.0 psig.

Typical compositions of the regenerator effluent gas and regenerator gas that is subsequently burned in a CO boiler are as follows:

| Composition of Regenerator Gas Emanating from a CO Boiler | |
|---|---|
| Nitrogen | 65 to 75 mol % |
| Oxygen | <0.5 to 5 mol % |
| Carbon Dioxide | 10 to 15 mol % |
| Water Vapor | 10 to 25 mol % |
| Sulfur Oxides | 20 to 1800 vppm |
| Nitrogen Oxides | 50 to 500 vppm |
| Solid Particulates | 0.02 to 1.0 grains/standard cubic feet (SCF) |

| Composition of Regenerator Gaseous Effluent | |
|---|---|
| Nitrogen | 60 to 70 mol % |
| Oxygen | <0.5 mol % to 5 mol % |
| Carbon Dioxide | 6 to 20 mol % |
| Carbon Monoxide | 0 to 10 mol % |
| Water Vapor | 10 to 30 mol % |
| Sulfur Oxides | 20 to 1800 vppm |
| Nitrogen Oxides | 0 to 500 vppm |
| Solid Particulates | 0.04 to 1.2 grains/SCF |

While the FIGURE hereof is for a partial burn operation, this invention is also applicable to a full burn operation. A gaseous effluent is removed from a fluid catalytic cracking regenerator 1 via line 10 and introduced into a CO boiler 2 where it is burned to convert at least a portion of it to $CO_2$. CO boiler 2 is not necessary when the instant invention is practiced in a full burn mode because substantially all of the CO will have been converted to $CO_2$. In such a mode, because the gaseous effluent from the regenerator will contain little, if any, CO the effluent stream is sent directly to the scrubber 3. Scrubber 3 can be any suitable type of wet gas scrubbing device suitable for such use. The scrubbers used in the practice of the present invention can be with both co-current and countercurrent contacting of gas and liquid. Venturi type scrubbers are preferred. There are two major types of gas scrubbers used in petroleum refineries. One type is the liquid jet ejector venturi scrubber wherein a high pressure nozzle with a large scrubbing liquid volume aspirates the gas through the unit. At the throat, breakup of the liquid droplets creates a large surface area for gas absorption to occur. Solid particulates down to about 1 micron in size are also removed through impaction with the droplets. Such scrubbers can be arranged in series to increase removal efficiencies. Another type of venturi scrubber that can be used the practice of the present invention and that is common to petroleum refineries is the so-called high energy venturi scrubber. Energy is supplied by a source of particulate laden high velocity gas stream used to atomize a liquid scrubbing stream as the two meet at the throat of the venturi and expand into the enlarged section. Cyclonic gas flow in a separator drives the particulate laden liquid to the outside wall of an adjoining cylindrical vessel where the liquid is collected and returned in a sump. The liquid jet ejector venturi scrubber is the more preferred for the practice of the present invention.

The effluent stream emanating from the CO boiler will be at a pressure from about −0.05 psig to about 1 psig, preferably from about 0.1 to about 1 psig and at a temperature from about 200° F. to about 1,000° F., preferably from about 200° F. to about 600° F. The gaseous effluent from the CO boiler is typically comprised of carbon dioxide, oxygen, sulfur dioxide, sulfur trioxide, nitrogen, nitrogen oxides, condensable materials, and solid particulates, which are mostly fines of the cracking catalyst utilized during the fluid catalytic cracking process. Typical catalysts utilized for FCC include siliceous materials, such as, silica; amorphous or crystalline (zeolites) silica-alumina; silica-zirconia; silica-magnesia, etc. From about 1 to 40 wt. % of the catalyst particles in the gaseous effluent are under one micron in size. Condensable materials are any constituents of the gaseous effluent (excluding water vapor) that would condense out of the gaseous effluent as a solid or as a liquid under operating conditions of temperature and pressure. Non-limiting examples of such condensable materials include inorganic materials, such as, sulfate salts, and $H_2SO_4$, as well as, organic materials of hydrocarbonaceous nature. The gaseous CO boiler effluent is removed via line 12 and can be optionally sprayed with water introduced via line 14 to saturate the gaseous mixture to at least its dew point. Water saturating the effluent stream prior to introducing it into scrubber 3 will prevent the vaporization of the scrubbing solution upon contact with a hot, water-unsaturated gas and will also serve to cool the stream. The CO boiler effluent is introduced via line 16 into scrubber 3, without any intermediate compression between the CO boiler and the venturi scrubber where it will contact a stream of an aqueous scrubbing mixture conducted via line 18 and sprayed into scrubber 3. If a jet ejector type venturi scrubber is used the CO boiler effluent will be introduced into the scrubber at an effective velocity, preferably from about 20 to 80 feet per second, and more preferably from about 40 to 50 feet per second. The scrubbing mixture is introduced into the scrubber at a ratio of 20 to 120 gallons of scrubbing mixture to 1000 cubic feet of gaseous effluent, preferably at a ratio of 40 to 80 gallons of scrubbing mixture to 1000 cubic feet of gas. The scrubbing mixture is introduced into the scrubber at a colder temperature than the temperature of the incoming gaseous effluent to aid in the desired entrapment of solid particles in the water. Desirably, the scrubbing mixture injected into the venturi scrubber is at a temperature from about 5° to 50° F., preferably about 10° F., colder than the incoming gaseous effluent.

It is critical that the scrubbing mixture be maintained at a pH in the range of 6 to 8, preferably between about 6.5 and below 7.5. Precise control of the pH will determine the degree of sulfur oxides removed from the gaseous effluent and will affect the operability of the system, particularly when it is conducted as a continued operation of a commercial unit. The pH is preferably maintained to be no higher than 7.5 to minimize undesired absorption of $CO_2$.

A basic material is added to the aqueous scrubbing mixture via line 20 to control the pH. The basic material may be, for example, an alkali metal hydroxide, ammonia or ammonium hydroxide. In a preferred embodiment of the present invention, a caustic such as sodium hydroxide is used as the basic material. Contact of the scrubbing mixture with the incoming gaseous effluent removes sulfur oxides from the effluent by reaction with the basic material. The scrubbed gaseous effluent and the scrubbing mixture flow through a constricted flow passage in the case of a venturi scrubber, whereby the velocity of the admixture of gaseous effluent/scrubbing mixture is increased. At least a portion of the total effluent of the scrubber, that is, the mixture of gaseous effluent and liquid is removed from the scrubber via line 22 and introduced to separator zone 4 above a level L of any liquid that may be present at the bottom portion of separator drum 4.

The non-condensable gaseous portion of the scrubbed effluent flows upwardly in the separator drum and can be reheated above its dew point prior to discharge into the atmosphere via stack 24. Desirably, the reheating is carried out in such a way as to raise the temperature of the gaseous portion by about 5° to about 75° F., preferably by about 20° F. This may be accomplished by injecting a suitable hot gas via line 26 into the upflowing stream of cleaned gaseous effluent. The hot gas may be the effluent of a gas heater 5 into which is introduced a fuel gas via line 28 and air via line 30.

Contaminated liquid scrubbing mixture LSM will form a liquid phase at the bottom portion (liquid hold-up zone) of separator 4. It will typically contain suspended solids (catalysts) and dissolved solids, such as, sodium sulfates, sodium sulfites, ammonium sulfates, as well as, condensable liquid contaminants, such as $H_2SO_4$. Make-up water may be introduced into the liquid hold-up zone of separator 4 via line 32. Basic material, which in the most preferred embodiment is sodium hydroxide is introduced via line 20 into the liquid hold-up zone of the separator to maintain the pH of the scrubbing mixture at the desired level. An effective amount of ammonia, preferably vaporized ammonia, is introduced into separator 4 via line 36. By effective amount of ammonia we mean at least that amount needed to reduce the level of $SO_2$ in the gaseous effluent to less than 25 ppmv. In a preferred embodiments, an amount of ammonia is introduced into the separator 4 to reduce the level of $SO_2$ in the gaseous effluent to less than 15 ppmv, and even more preferably to reduce the level of $SO_2$ in the gaseous effluent to substantially zero. The treated gaseous effluent then passes through a second contacting zone 35. This contacting zone uses a countercurrent aqueous solution. It is believed that there is a synergistic effect in the second stage chemistry with respect to the combination of caustic and ammonia and water for removing substantially all remaining sulfur dioxide. If vaporized ammonia is injected below this contacting zone at 36, water is added at the top of the contacting zone at location 37 wherein it is distributed as uniformly as possible across the top of the zone so that it will flow downward throughout the second contacting zone 35. Alternatively, if vaporized ammonia is not used, an aqueous solution of ammonia and/or caustic is added at location 37.

At least a portion of the liquid present in separator 4 is withdrawn via line 34. If desired, at least a portion of this liquid is cooled to a desired temperature by conventional means, such as, a heat exchanger (not shown in the drawing), and recycled to the scrubber 3 via line 18 as the scrubbing mixture. Alternatively, make-up sodium hydroxide can be added via line 29 to line 18 instead of being introduced into the separator, or in addition to being introduced directly into the separator drum. Another portion of the liquid from the separator drum can be removed from the process and, if desired, subjected to further treatment, such as, concentration and removal of solids and treatment of the liquid waste to make it suitable for disposal.

The following examples will serve to illustrate, but not limit, this invention.

A series of experiments were conducted to show the unexpected results for reducing the level of sulfur dioxide in a gaseous stream when treated with both a water wash as well as a water wash and a vapor ammonia treatment in the separation zone of the present invention. Example 1 is the case where both the water wash, as applied via line 37 of the FIGURE hereof and vaporous ammonia via line 36 of the FIGURE hereof is applied to a sulfur dioxide containing gas. Comparative Example A is when only vaporous ammonia is introduced and not the water wash. Comparative Example B is when neither the water wash or the ammonia treatment is used and Comparative Example C is when only the water wash is used. Example 2 again represents the situation when both the water wash and vaporous ammonia treatment is used, at a later point in time. The table below shows the results of these experiments.

|  | Example 1 | Example A | Example B | Example C | Example 2 |
|---|---|---|---|---|---|
| Grid Wash, gallons/minute | 78 | Min | Min | 78 | 78 |
| Vaporized $NH_3$ | On | On | Off | Off | On |
| Stack $SO_2$, ppmvd @ 0% $O_2$ | 17-24 | 32-40 | 51 | 38 | 8-12 |

What is claimed is:

1. A process for removing sulfur oxides and solid particulates from a gaseous effluent containing same, which process comprises:

a) contacting, in a first contacting zone, the gaseous effluent with a first aqueous scrubbing solution comprised of a caustic, an effective amount of ammonia, or both, said scrubbing solution being at a pH of about 6 to about 8 which contacting is performed in a wet gas scrubber under high velocity mixing conditions thereby resulting in an admixture of a substantially solids free gaseous effluent and a liquid phase containing particulates and dissolved sulfur oxides;

b) passing the resulting admixture to a separation zone wherein the liquid phase containing the particulates is separated from the substantially solids free gaseous effluent which has a reduced level of sulfur oxides;

c) mixing an effective amount of vapor phase ammonia with said substantially solids free gaseous effluent;

d) contacting, in a second contacting zone, said mixture of step c) above with a second aqueous scrubbing solution to produce a scrubbed gaseous effluent and a sulfur-containing aqueous solution;

e) separating at least a portion of the sulfur-containing aqueous solution from the scrubbed gaseous effluent; and f) emitting said scrubbed gaseous effluent into the atmosphere, wherein the scrubbed gaseous effluent is substantially free of particulates and contains less the 25 ppmv of sulfur dioxide.

2. The process of claim 1 wherein vaporized ammonia is introduced upstream of a venturi scrubber.

3. The process of claim 1 wherein the scrubbed gaseous effluent is heated above its dew point prior to being discharge into the atmosphere.

4. The process of claim 1 wherein said gaseous effluent is produced in a regeneration zone of a catalytic cracking process.

5. The process of claim 1 wherein said gaseous effluent is a gaseous mixture produced by burning the effluent of a regeneration zone of a catalytic cracking process in a combustion zone.

6. The process of claim 5 wherein said combustion zone is a CO boiler.

7. The process of claim 1 wherein said gaseous effluent is comprised of catalyst fines, one or more sulfur oxide species, carbon dioxide, nitrogen and water vapor.

8. The process of claim 1 wherein said caustic is sodium hydroxide.

9. The process of claim 1 wherein step (e) also comprises introducing additional basic material into the sulfur-containing aqueous solution.

10. The process of claim 1 wherein the contacting of said gaseous effluent and ammonia is contacted with said water by passing said gaseous effluent and ammonia upward countercurrent to downflowing water.

11. The process of claim 1 wherein the scrubbed gaseous effluent contains less the 15 ppmv of sulfur dioxide.

12. The process of claim 11 wherein the scrubbed gaseous effluent is substantially free of sulfur dioxide.

13. The process of claim 1 wherein at least a fraction of the sulfur-containing aqueous solution from the separation zone is recycled to said first contacting zone.

14. The process of claim 13 wherein the sulfur-containing aqueous solution is cooled prior to being recycled to said first contacting zone.

15. The process of claim 1 wherein additional basic material and water are introduced into said separation zone.

16. The process of claim 1 wherein additional aqueous scrubbing solution is introduced into said separation zone.

17. The process of claim 1 wherein at least a portion of said sulfur-containing aqueous solution is removed from the separation zone and further treated to remove solids therefrom.

18. The process of claim 1 wherein said aqueous scrubbing solution is from about 5° F. to about 50° F. cooler than the temperature of the gaseous effluent being treated.

19. The process of claim 1 wherein said gaseous effluent is saturated with water prior to it being contacted in said first contacting zone.

20. The process of claim 1 wherein said gaseous effluent is a gaseous mixture produced by burning of a carbonaceous fuel.

21. The process of claim 1, wherein step (a) also comprises contacting the first aqueous scrubbing solution and the gaseous effluent in the first contacting zone at a ratio of about 20 to 120 gallons of first aqueous scrubbing solution to about 1000 cubic feet of gaseous effluent.

* * * * *